Patented Mar. 5, 1940

2,192,585

UNITED STATES PATENT OFFICE 2,192,585

ADHESIVE

Earle R. Edson and George F. Mach, Gloucester, Mass., assignors to Russia Cement Company, Gloucester, Mass., a corporation of Massachusetts No Drawing. Application January 16, 1937, Serial No. 120,931

3 Claims. (Cl. 134—23.4)

This invention relates to adhesives and particularly cold water soluble adhesives for the joining of paper or for the joining of cardboard and other cellulose materials.

In the manufacture of adhesives for commercial use, particularly by machines, it has become a matter of great importance that the manufacturer shall be able to buy a dry product which may be mixed for use as an adhesive by the addition of water at normal room temperatures or thereabouts, and which will become an adhesive fit for use in machines with a limited amount of water.

Hitherto there have been many different adhesives for use in machines for the joining of cellulose materials, of which an important example is the making of envelopes. Hitherto, it has been a usual practice with regard to the making of envelopes, for instance, to use an adhesive which contains sugar or glycerine or some similar product and which is heated to a comparatively high temperature before it is fitted for use in the machine. All of this involves delay and the necessity of skilled technicians to make the mixture.

We have found that a dry product may be made by mixing a suitable dispersing agent preferably in powder form with any partially or wholly dextrinized starch. When this product is mixed in water in proper concentration, it will burst the starch cells, form a homogeneous solution or dispersion and be suitable as an adhesive for various purposes in accordance with the characteristics of the particular starch product used and the chemical used to make the dispersing agent or powder by which the granules are dispersed.

Almost any chemical can be used as a dispersing agent which will have the effect of dispersing the starch granules and will form a homogeneous colloidal solution if used in the appropriate concentration. A vital point is that the powder must contain chemicals which are adapted to burst the starch cells and form a homogeneous solution or dispersion when mixed with dextrine and water in a proper concentration. This concentration differs greatly in accordance with the properties of the particular starch product used.

We have found that any chemicals which will disperse the starch granules in a water solution will (if mixed in appropriate amounts in powder form with a starch dextrine) result in a mixture which (mixed with appropriate amounts of water) will make an adhesive suitable for many uses. It is necessary that the dispersing chemicals be suitable to form a dry mixture and stand in a dry mixture without deterioration of the chemicals or the dextrine. For example, NaOH, or other deliquescent compound is totally inadmissible.

However, although the use of a dispersing agent, as above-described, will produce an adhesive valuable for many purposes, for certain purposes it is important to avoid the use of a dispersant which will cause distortion of the material to be joined. For instance, one of the important uses of adhesives is for the making of envelopes.

For the making of envelopes we have found that if urea is used as a dispersing agent alone there will be a distortion of the joined parts which is extremely undesirable for commercial purposes and that this is true even if a small amount of some other material is mixed with the urea.

We have found, however, that if the urea is mixed with a large amount of some other material the combined effect of the materials used will be a dispersant which will not cause undue distortion of the surface to be joined.

We have found that unless the total dry powder contains at least 10% by weight of some material other than urea a distortion highly undesirable for many purposes will result. This material we call a counteracting material.

These counteracting materials must be chosen with great care and must be materials which have not been found to be unsatisfactory in themselves for envelope machines; for instance, glycerine or sugar, although useful in certain atmospheric conditions is known to be bad in others.

We have found sodium chloride is a very counteracting material if used in sufficient quantity.

We have made many mixtures in powder form which can be mixed in water at ordinary room temperatures by the manufacturer without the use of any technical skill whatever in accordance with the foregoing invention. They may, of course, be heated if desired but the heating is unnecessary. The mixture in powder form may be either a single powder or a number of powders or a powder and a liquid. A substantial amount of liquid may be added to a powder and yet the product will be a powder. Our invention requires that the proportion of dispersant used must be large in proportion to the amount of dextrine. If the dispersant is not in excess of 25% by weight of the amount of dextrine used it does not come within the terms of this invention.

*Example 1.*—We take a suitable dextrine, for instance, No. 3130 sold by the Russia Cement Company, and mix 100 parts of the dextrine with 40 parts urea and 28 parts of common salt, by weight. This is a dry powder and when thoroughly mixed should be added to 80 parts by weight of water. If too little water is used then the mixture will be insufficiently moistened and so too heavy to stir. If too much, then the solution is so weakened that there is insufficient action taking place to burst open the starch cell. This should be thoroughly stirred and allowed to stand for several hours when it will be ready for use in the ordinary envelope machine without further treatment. It will join envelopes made of almost any kind of paper. In addition to its strongly adhesive qualities the envelopes may be joined with a flat seam which will scarcely show the seam. Moreover, if a colorless dextrine is used there will be little or no discoloration by time.

In this example we have taken dextrine which is sold as No. 3130 by the Russia Cement Company and is suitable, when used in various cooked solutions with sugar or other suitable products, for use in envelope machines but any dextrine suitable for use in envelope machines with proper treatment may be used, though experiment may prove that the proportions of the materials should be somewhat varied according to the qualities of the dextrine. As is well known, the properties of dextrine are extraordinarily complex and it is very hard to predict the action of any particular dextrine so that experiment will be necessary to make sure that the proper amount of the various chemicals is used for the particular dextrine used. This No. 3130 dextrine has a polariscope test of 19.6 and forms a strong adhesive when mixed for many purposes. A determination of this value is made by mixing five (5) grams of dextrine with water, so that the total volume of solution is one hundred cubic centimeters. The solution must be made at a temperature not sufficient to cause a swelling of any insoluble or incompletely converted starch which exists in the dextrine being tested. After mixing the dextrine and water, as above described, the solution must be periodically shaken for a period of one hour, more or less. The solution is then filtered to remove the insoluble portions and the filtrate is filled into a 100 mm. observation or control tube. This filled tube is placed in a saccharimeter (we prefer the Bausch and Lomb Saccharimeter) as instrument #487, which contains a Lippich double prism polarizer with adjustable half shade angle and the Ventske scale based on the Bates-Jackson conversion factor of 34.620° for a normal weight of 26 grams of sucrose. A reading is then made of the degree of rotation with the solution at 20° C.

The common salt used may either be a purified sodium chloride or the ordinary rock salt of commerce, which, of course, has magnesium chloride and a trivial amount of calcium chloride but not in quantities sufficient to be harmful.

*Example 2.*—Take 100 parts by weight of a dextrine which is sold as Base No. 2 by Stein-Hall & Company, or 100 parts by weight of a dextrine sold as bag-gum made by Joseph Morningstar & Company, to which is added 40 parts by weight of urea and about 26 parts by weight of sodium chloride. This is a dry powder and when thoroughly mixed may be added to 80 parts by weight of water. This will also run perfectly well in an envelope machine with commercial results.

In the above descriptions, reference is made chiefly to use for the plunger type of envelope machine. For use in rotary machines it is well known that a more fluid type of adhesive must be used. The products made by the above examples may be used on a rotary envelope machine but must be more dilute according to the well known practice of the art.

For use for pasting paper on cardboard the product of Example #1 and of most of the other examples may be used. All are suitable for use in various automatic machines.

The amount of the dispersant used must be sufficient to burst the starch granules when mixed with water. The amount of water used must not be so great as to make too dilute a mixture for dispersion or too thick to operate properly in the machine. The proportions stated in Example #1 cannot be varied very much for the dextrine named, No. 3130, to get the best results. If other dextrines are used the amount of dispersant and water required for the best results can readily be determined by following the proportions given in the examples, changing the amounts of the dispersant and water if they are not sufficient to burst the starch granule or make a sufficiently free-flowing solution. After a mixture has been made which has burst the starch granules more water can often be added to make a sufficiently liquid solution.

The amount of the dispersant must be at least 25% of the dextrine by weight.

In this specification the word "adhesive" is limited to adhesives containing or formed from dextrine. The term "dextrine" is used in the claims to include not only completely dextrinized starch but any starch which is partially dextrinized or modified so that it will polarize light.

The term "dispersing agent" is used to include either one compound or any number of compounds which together will act to burst the starch cell of the dextrine with which they are associated, when added to water in proper amount to provide a solution of proper concentration.

The term "sodium chloride" is used in the claims to include sea salt or a similar mixture of the compounds found in the ocean or salt mines.

Although we expect to sell the product of our invention as a powder consisting of dextrine and a dispersant we may sell the dextrine and the dispersant separately. The combining of the dextrine and the dispersant and water to form an adhesive will make an adhesive which is the subject matter of our invention. Although our invention is a cold soluble adhesive very convenient to prepare, yet the use of heat or other immaterial factors will not constitute a departure from our invention provided an adhesive is made by mixing a dextrine with more than 25% its weight of a dispersant of the described qualities which is normally a powder and has no qualities rendering it unsuitable for use as an adhesive and the amount of water in the adhesive is proportioned to cause the desired reaction.

In speaking of adhesives for envelopes, we do not refer to adhesives for sealing the front flap of the envelope but the back seam, so-called. The front flap is usually sealed with a nearly pure dextrine. It is probably undesirable to use an adhesive for the flap of an envelope made according to our invention.

The method set forth in the foregoing specification is new in that a large proportion of a dry dispersing agent is mixed with a dry dextrine and the mixture is mixed with an amount of water, preferably at ordinary room temperature, which will make a highly concentrated solution or dispersion which will burst the starch cell.

When the water has been added to the dry mixture, or vice versa, the mixture is stirred thoroughly and allowed to stand until the solution has become homogeneous, which usually requires several hours. The time for dispersion is largely dependent on the temperature of the water, the amount of stirring and the rate at which the dry powder is added to the water. When thoroughly dispersed it may be used without change in an envelope machine, or, if it is desirable, it may be further diluted according to the requirements of the machine in which it is to be used and the products to be attached together. This is often done with present mixtures, not by diluting with water, but by adding the necessary amount of a more dilute mixture which has been prepared for the purpose and thoroughly mixed.

We claim:

1. A liquid adhesive comprising a water solution of a partially-converted dextrine, urea and sodium chloride in the approximate proportions by weight, dextrine 100, urea 40, sodium chloride 28, water 80.

2. An adhesive preparation comprising a dry intimate mixture of partially-converted dextrine, urea and common salt in the approximate proportions of 100 parts of dextrine to 40 parts urea and 28 parts of salt, all by weight.

3. A liquid adhesive comprising a water solution of a partially-converted dextrine, urea and sodium chloride, the urea being present in the amount of between 25% and 50% of the weight of the dextrine so that the adhesive is suitable for use in an envelope machine where the weight of water is less than the weight of all the solid constituents of the solution, and the sodium chloride being present in the amount of between 14% to 28% of the weight of dextrine to substantially prevent distortion of adhesive-carrying paper.

EARLE R. EDSON.
GEORGE F. MACH.